(12) United States Patent
Masuda

(10) Patent No.: US 7,259,852 B2
(45) Date of Patent: Aug. 21, 2007

(54) MODIFIED-COLOR GENERATION AND DISPLAY METHOD AND APPARATUS

(75) Inventor: Yutaka Masuda, Fujisawa (JP)

(73) Assignee: Kansai Paint Co., Ltd., Kyogo-Ken (JP)

( * ) Notice: Subject to any disclaimer, the term of this patent is extended or adjusted under 35 U.S.C. 154(b) by 411 days.

(21) Appl. No.: 10/882,398

(22) Filed: Jul. 2, 2004

(65) Prior Publication Data

US 2004/0239928 A1     Dec. 2, 2004

(51) Int. Cl.
*G01J 3/46*     (2006.01)
(52) U.S. Cl. .................. 356/402; 356/421; 356/319
(58) Field of Classification Search .............. 356/402, 356/421, 425; 345/591, 594, 589; 250/226
See application file for complete search history.

(56) References Cited

U.S. PATENT DOCUMENTS

| | | | | |
|---|---|---|---|---|
| 4,887,906 | A | * | 12/1989 | Koehler ...................... 356/402 |
| 5,740,079 | A | * | 4/1998 | Shigemori et al. .......... 356/402 |
| 6,362,885 | B1 | * | 3/2002 | Osumi et al. ................ 356/402 |
| 6,772,151 | B1 | * | 8/2004 | Johnston et al. .............. 707/6 |
| 7,064,830 | B2 | * | 6/2006 | Giorgianni et al. .......... 356/402 |

* cited by examiner

*Primary Examiner*—Layla G. Lauchman
(74) *Attorney, Agent, or Firm*—Wenderoth, Lind & Ponack, L.L.P.

(57) ABSTRACT

A modified-color generation and display method uses a computer graphic. The method includes measuring the spectral reflectance of an original color by using a spectrophotometer, obtaining a modified spectral reflectance for a modified color by changing the measured spectral reflectance, and displaying the computer graphic of the modified color on a monitor.

20 Claims, 9 Drawing Sheets

Prepared color filter

System block diagram

Flowchart of the present invention

Fig. 3

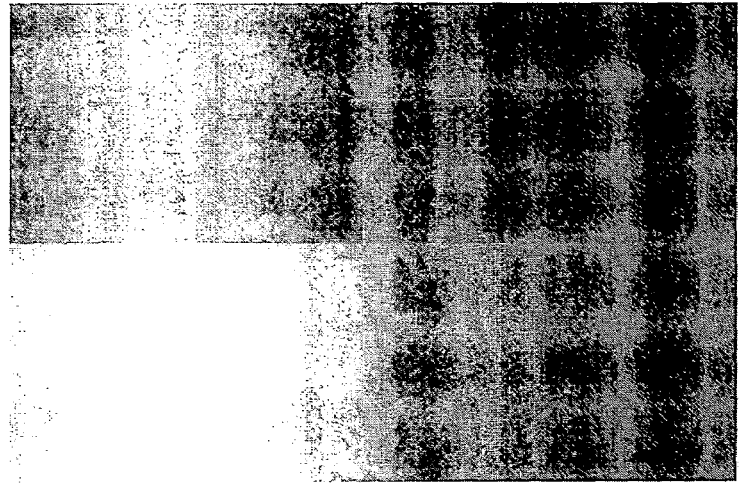

Computer screen of color modifying operation

*******************************************
Simulation for modifying color on screen v1.0
*******************************************

<Original color information>
Original color name: Cn    Modified color name: Cn-x'

Y15 (=IV68) =271.1  L15=145.8
Y45 (=SV68) = 43.8  L45= 72.1 -- FF68=1.44

Color tincture    h15=247.6 h45=244.2 / c15= 0.8 c45= 1.8
Color difference  dE15=19.7 dE25=14.8 dE45= 7.6 dE75= 2.8 dE110= 0.0

<Checking color reproducing region>
Warning!, Y25 is high. ---- Upper limit of 2CIB step is 150.0.
Warning!, Y15 is high.---- Upper limit Y15 of FF68 range [1.4-1.6] in
                            2CIB step is 260.0.

<Color modification menu>
IV68 increase/decrease (1/-1) SV68 increase/decrease (2/-2)
FF69 increase/decrease (3/-3)
Red tincture Increase (+) Decrease (-) All angles (4/-4) hi-light (5/-5) shade (6/-6)
Green tincture Increase (+) Decrease (-) All angles (7/-7) hi-light (8/-8) shade (9/-9)
Blue tincture Increase (+) Decrease (-)
                            All angles (10/-10) hi-light (11/-11) shade (12/-12)
Yellow tincture Increase (+) Decrease (-)
                            All angles (13/-13) hi-light (14/-14) shade (15/-16)
Chroma Increase (+) Decrease (-) All angles (16/-16) hi-light (17/-17) shade (18/-18)
Wavelength Shift  All angles (19/-19) hi-light (20/-20) shade (21/-21)
30=Color mixing FileOpen 31= Input paint color name 32= Input ratio
33= Color mixing execution 50=Return to original Ref 51=Return to Ref one before
52=Input paint color step. 90=CS image storage  91=Reflectance storage
92=Next sample 99or<ret>=end close file:

Color modification according to change of chroma

Fig. 8
Color modification according to color filter method
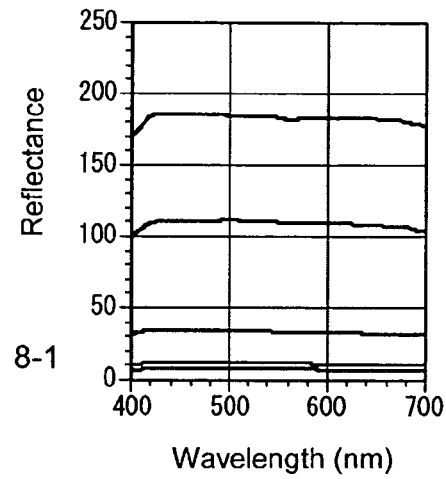
8-1
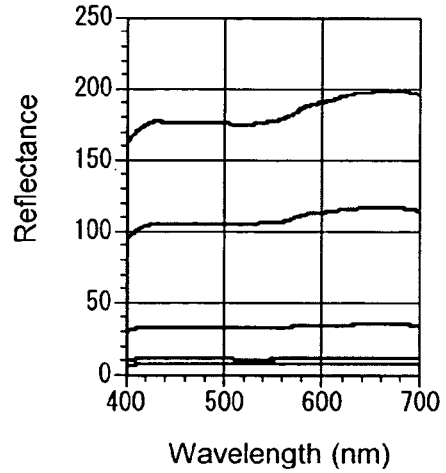
8-2
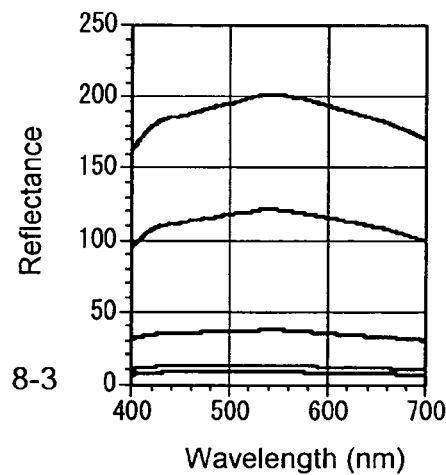
8-3
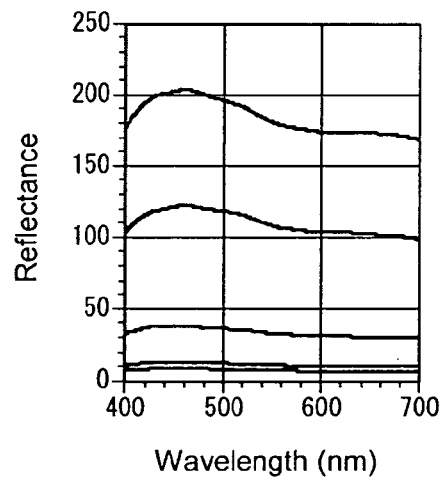
8-4
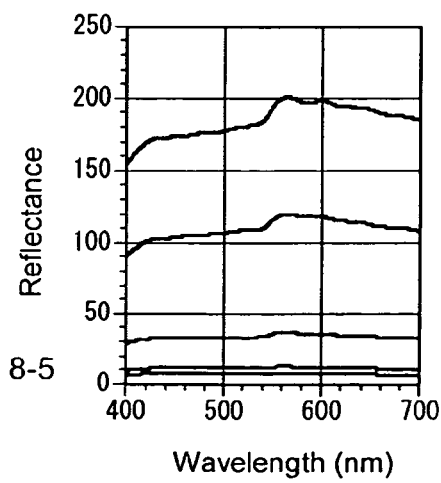
8-5

Fig. 9
Color modification according to mixing of another color
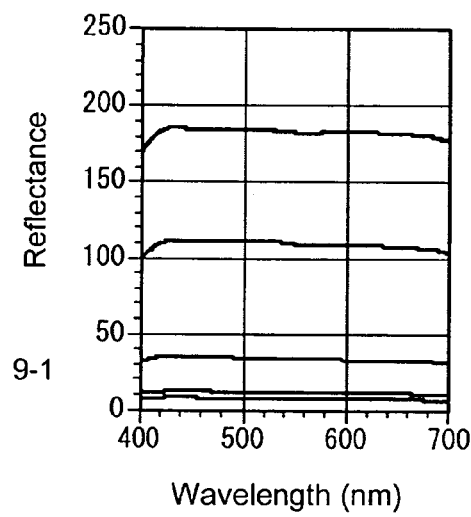
9-1
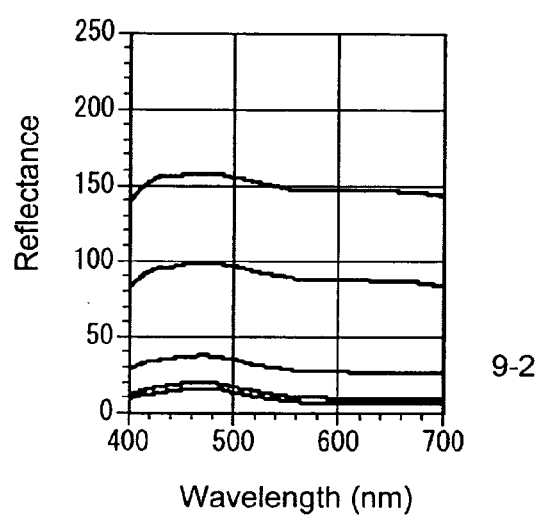
9-2
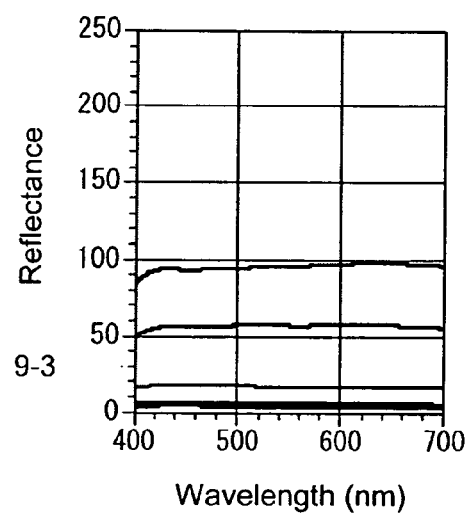
9-3
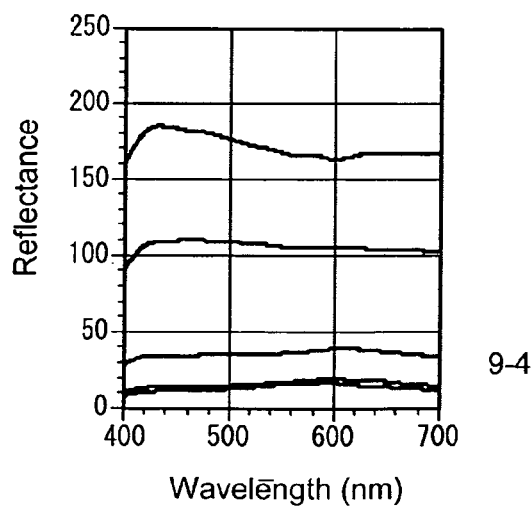
9-4

MODIFIED-COLOR GENERATION AND DISPLAY METHOD AND APPARATUS

FIELD OF THE INVENTION

The present invention relates to a modified-color generation and display method using computer graphics for optionally changing the appearance (which is a visual impression and is represented by metallic sense and pearl sense) of a paint color and outputting it to a screen as a computer graphic.

In this specification, the present invention is described as a method and an apparatus for treating a metallic color. However, it is clear that the present invention can be applied not only to a metallic color but also to a solid color.

BACKGROUND OF THE INVENTION

In recent years, to improve the paint color development speed of an automobile company, a paint-design support tool using a computer has been developed in various fields. For example, to improve the design effect, there is a metallic paint color obtained by mixing a chromatic pigment and a flaky effective pigment (aluminum flake or pearl flake) or micro titanium oxide using Rayleigh scattering in a binder. Because the brightness, chroma, and hue are changed depending on a seeing angle, appearance such as metallic sense and pearl sense is felt.

As a conventional method for developing these paint colors, a method is generally used in which a designer, referred to as a color stylist, of an automobile company orally describes desired appearances of cloth, a cosmetic bottle, a shell, and an image in a magazine to a toning designer of a paint company to ask the designer about the development of paint colors, and this communication is in the main stream also at present. Because this method depends on an individual experiment and expression ability, non-efficiency, because a paint color which does not satisfy an order can be prepared, is regarded as a problem due to a difference between the opinions of a color stylist, who is an orderer of colors, and a toning designer.

However, emblematic of the IT revolution, because the performance of equipment for measuring a color, computers, and display monitors are improved, performing paint color design using a computer is a need of the time in automobile and paint companies. By using this equipment, it is possible to expect improvement in the accuracy of and speedup of paint color development.

The present invention provides an algorithm and procedure of a computer system for optionally changing the appearance of a metallic paint color including flake pigments having many colors on a screen and displaying a new color on the screen.

When designing a new design on a screen, a new color is not prepared from completely nothing. In general, a method has been used so far in which a color (this is referred to as a modified color) is obtained by correcting and changing a paint color (this is referred to as an original color) that has been prepared in the past that goes in the preferred direction.

Therefore, an algorithm and procedure for actually preparing a modified color are finished as a system by measuring a metallic paint color which is an original color by a goniospectrophotometric calorimeter, changing a reflectance at every angle such as the whole receiving angle, highlight, front, or shade, thereby changing a color and appearance to prepare a new color, converting the prepared color into RGB and displaying the original color and modified color on a screen as full color graphic to visually determine the appearance, using a decided spectral reflectance and thereby searching an approximate color from a database for existing paint colors to obtain a past formulation, and obtaining an estimated formulation in accordance with metallic CCMS. A system is provided which is able to compute a multi-angle spectral reflectance, prepare a computer graphic in accordance with a reflectance in which a color and appearance are optionally changed, display images of the original color and modified color at the same time and visually evaluate them, search an approximate color in accordance with the paint color database, or calculate a formulation in accordance with CCM.

A metallic color is measured by a large goniospectrophotometric colorimeter (GCMS made by Murakami Color Research Laboratory) to calculate an appearance parameter in accordance with a goniospectrophotometric reflectance. There is a computer graphic apparatus having means for calculating first=depending on a spectral wavelength and second=depending on a receiving angle and estimating a spectral reflectance in which appearance is changed (refer to Japanese Patent Application Publication No. 123981/1996). Though the goniospectrophotometric colorimeter used for this method is precise because measurement can be made every degree, it has a disadvantage that measurement requires a lot of time. Moreover, it is necessary to calculate two characteristic parameters by previously computing many goniospectrophotometric reflectances.

There is a method for mapping a measured value every degree into an angle of an automobile shape by the large goniospectrophotmetric colorimeter (GCMS made by Murakami Color Research Laboratory), displaying it by a commercial photograph editing software, and masking it to correct a color (refer to Japanese Patent Application Laid-Open No. 222653/1998). In this case, the original color has a color-measured reflectance. However, a modified color has RGB values to be processed by the photograph editing software but it cannot be obtained from a spectral reflectance. Moreover, because a corresponding relation between the receiving angle of the modified color and the color cannot be clarified, it is impossible to search the modified color from a paint-color database or perform CCM in accordance with a reflectance.

There is a method for preparing a real photograph by mapping it into the spectral reflectance of a paint color and the three-dimensional shape of an automobile shape and rendering it while including environmental light to evaluate an outer plate color of an automobile (refer to Japanese Patent Application Laid-Open No. 66119/1999). However, this is a method for mapping an existing paint color into a three-dimensional shape. It does not chromatically change an original color or prepare a new color.

There is a method for converting the RGB of a CG (simulation image or digital camera image) into XYZ and searching an approximate color from a database by using a fuzzy inference and considering the ambiguity of a person (refer to Japanese Patent Application Laid-Open No. 269411/1999). This method does not prepare a modified color from the spectral reflectance of a measured color value.

By using a sample book database (including paint formulation), the goniospectrophotometric color measured value in the database, and the three-dimensional data for an automobile, a CG of the automobile is prepared by rendering the modified color measured value and the three-dimensional data at a high speed. Moreover, a color is set so that a designer can select a paint color in accordance with a design term by linking with sensibility information (refer to Japanese Patent Application Laid-Open No. 66119/1999). This is retrieval of a sensibility database but it is not a modified color.

There are a color conversion method for converting the original color of an original image into a modified color and a method for rendering an automobile into a color seen under external light by using the database of the characteristic data for original colors (Japanese Patent Application Laid-Open No. 232430/1999: Object-image color modification method). However, this is a method for changing colors in accordance with the same technique as that shown in Japanese Patent Application Laid-Open No. 123981/1996 and has the disadvantage that two characteristic parameters must be calculated by previously computing many goniospectrophotometric reflectances.

Therefore, it is an object of the present invention to provide a design tool capable of developing a new paint color, particularly determining the quality of a design by computing a reflectance without greatly deteriorating the characteristic of a spectral reflectance obtained from a multi-angle spectrophotometer of original colors, slightly correcting colors, calculating the spectral reflectance of a new modified color, using the spectral reflectance as a computer graphic and thereby simultaneously displaying images before and after being changed on a monitor, and visually determining a color correction direction.

It is another object of the present invention to provide a paint-color design tool for an industrial purpose of displaying a message showing whether the determination showing whether a modified color after being changed can be realized in a desired painting process (for example, multi-layer coating such as 2C1B or 3-coat), and the application line of a targeted automobile company is industrially effected by collating the determination with the limit value of preset color reproduction.

It is still another object of the present invention to provide an approximate color retrieval tool for new design development for searching approximate colors at multi-angles from an existing paint-color database by using a changed spectral reflectance and searching a most approximate color and a color having an appearance and quickly preparing a modified color in accordance with the paint color of a retrieval result.

It is still another object of the present invention to provide color-designing metallic CCM for quickly preparing a modified color by using the spectral reflectance of a modified color and thereby performing metallic CCM in accordance with the above approximate color retrieval when there is no approximate color and calculating a formulation of color materials through calculation.

SUMMARY OF THE INVENTION

To solve the above conventional problems, the present invention provides a modified-color generation and display method using a computer graphic. The spectral reflectance of an original paint color is measured by using a spectrophotometer. A changed spectral reflectance of a modified color is obtained by changing the measured spectral reflectance, and the computer graphic of the modified color is displayed on a monitor.

In the case of a preferred mode, it is included that the spectral reflectance of an original paint color which is a metallic color is measured by using a multi-angle spectrophotometer.

In the case of another preferred mode, it is included that the spectral reflectance of an original paint color is measured by using a multi-angle spectrophotometer when receiving angles respectively shown by a deflection angle obtained by assuming specular reflection of incident light as 0° are five or more angles between 10° and 100°.

In the case of still another preferred mode, it is included that a changed spectral reflectance is obtained by multiplying a measured spectral reflectance by a coefficient.

In the case of still another preferred mode, the above coefficient has the same value for all angles.

In the case of still another preferred mode, it is included that the above coefficient is present in a range between 0.5 and 1.5 for one operation and a color is stepwise changed by repeating an operation a plurality of times.

In the case of still another preferred mode, a coefficient is different every angle.

In the case of still another preferred mode, a changed spectral reflectance is obtained by extending the crest and trough of a measured spectral reflectance.

In the case of still another preferred mode, the maximum value of a measured spectral reflectance is expanded and the minimum value of it is contracted to mainly change a chroma.

In the case of still another preferred mode, the wavelength of a measured spectral reflectance is shifted to obtain a changed spectral reflectance.

In the case of still another preferred mode, a value for shifting the wavelength of a measured spectral reflectance ranges between −5 nm and +5 nm for one operation and a hue is mainly stepwise changed by repeating an operation a plurality of times.

In the case of still another preferred mode, a measured spectral reflectance is multiplied by a color filter coefficient to obtain a changed spectral reflectance.

In the case of still another preferred mode, the above color filter coefficient is present in a range between 0.8 and 1.2 in a wavelength range between 380 and 700 nm and stepwise changes a color by repeating an operation a plurality of times.

In the case of still another preferred mode, a changed spectral reflectance in which a color and appearance are changed is obtained by adding the spectral reflectance of another paint to a measured spectral reflectance at a blending ratio.

In the case of still another preferred mode, a changed spectral reflectance is obtained by adding a spectral reflectance obtained by multiplying the spectral reflectance of another paint by a blending ratio to a measured spectral reflectance.

In the case of still another preferred mode, it is included that a changed spectral reflectance is converted into RGB values to obtain a modified color specified by the RGB values.

In the case of still another preferred mode, it is included that the measured spectral reflectance of an original paint color is converted into RGB values to obtain an original paint color specified by the RGB values.

In the case of still another preferred mode, computer graphics of an original paint color and a modified color are displayed on a monitor.

In the case of still another preferred mode, computer graphics of an original color and a modified color are display on a monitor by using the measured spectral reflectance of the original color and spectral reflectance of the modified color.

In the case of still another preferred mode, computer graphics of an original paint color and a modified color are display on a monitor by using RGB values of the original paint color and RGB values of the modified color.

In the case of still another preferred mode, it is included to visually evaluate the color appearance/designing appearance of an original paint color and a modified color by using graphics of the original paint color and modified color displayed on a monitor.

In the case of still another preferred mode, it is included to check whether a paint for generating a modified color can be prepared.

In the case of still another preferred mode, it is checked whether a paint for generating a modified color can be prepared by using a table of upper limits of colors which can be prepared.

In the case of still another preferred mode, it is possible to replace the table of upper limits of the above colors which can be prepared for every painting process and application line of automobile manufacture.

In the case of still another preferred mode, when a modified color exceeds the upper limits of the table of upper limits of the colors which can be prepared, a warning message is displayed on a screen to prevent a nonrealistic color from being created.

In the case of still another preferred mode, it is included to search an approximate color of a modified color.

In the case of a preferred mode, an approximate color of a modified color is searched by using a changed spectral reflectance.

In the case of still another preferred mode, an approximate color of a modified color is searched from a paint-color database by using a changed spectral reflectance.

In the case of still another preferred mode, it is included to calculate the formulation of paints for generating a modified color.

In the case of still another preferred mode, a changed spectral reflectance is read into a CCM system to calculate the formulation of paints for generating a modified color.

Moreover, to solve the above problems of the prior art, the present invention provides a modified-color generation and display apparatus comprising a spectrophotometer for measuring the spectral reflectance of a paint color, means for changing the measured spectral reflectance to obtain the changed spectral reflectance of a modified color, and a monitor for displaying the computer graphics of the modified color.

By using the present invention, it is possible to digitally simulate a modified color of a metallic appearance paint color on the screen of a computer, realize an actual paint formulation by determining whether the paint color prepared through the simulation can be actually prepared, creating a color which can be industrially prepared at a spectral reflectance level, and moreover performing approximate color retrieval and metallic CCM by using the reflectance and prepare the modified color as a realistic color card in a very short time. By sharing the above method with a car stylist of an automobile company and a toning designer of a paint company, it is possible to decide the color appearance of a new color in a short time.

BRIEF DESCRIPTION OF THE DRAWINGS

FIG. 3 is a computer screen of a color change operation;
FIG. 5-1 to 5-3 are graphs of metallic colors in which IV68, SV68, and FF68 are decreased;
FIGS. 8-1 to 8-5 are graphs of silver metallic colors colored by putting color filters;
and
FIGS. 9-1 to 9-4 are graphs of silver metallic colors colored by mixing another color.

DETAILED DESCRIPTION OF THE INVENTION

Figure 1:
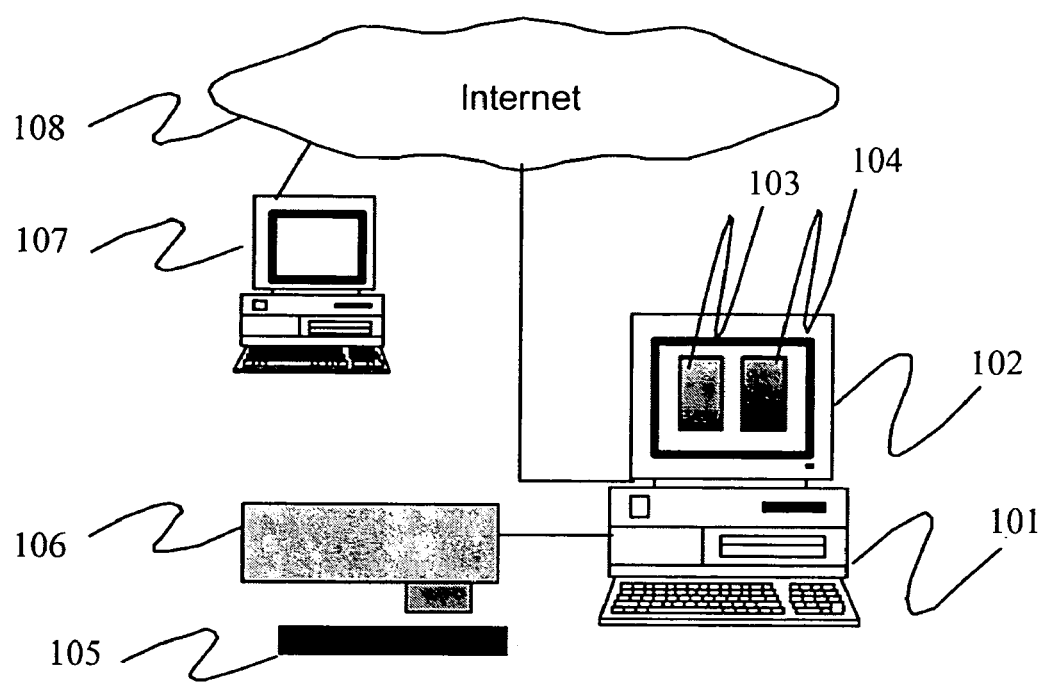
FIG. 1 is a system block diagram of the present invention.

FIG. 1 shows a system block diagram of the present invention. As shown in FIG. 1, a configuration is basic in which a monitor (102) capable of displaying full colors is connected to a normally-available computer (101). To obtain the goniospectrophotometric reflectance or multi-angle spectral reflectance of an original color, it is allowed to measure an actually-prepared color card (105) or obtain the spectral reflectance from a server (107) on a widespread network such as the internet (108) through the network. The CG (104) of an original color is displayed and the CG (103) of a modified color which can be prepared in accordance with the procedure described below is displayed to visually evaluate the color appearance/designing appearance of a paint color at the same time.

In this specification, "reflectance" denotes a reflectance (R %) at a certain wavelength $\lambda$, "spectral reflectance" denotes a reflectance $\{R(\lambda)\%\}$ every wavelength $\lambda$, and "multi-angle spectral reflectance" denotes a spectral reflectance at each of many angles. However, "spectral reflectance" may be merely referred to as reflectance. A metallic color shows a different color depending on a seeing angle. A solid color is not changed depending on a seeing angle. To measure a metallic color, it is necessary to use a multi-angle spectrophotometer but to measure a solid color, it is not necessary to use a multi-angle spectrophotometer.

The processing procedure is more minutely described below while referring to FIG. 2.

Firstly, a metallic paint color serving as an original color is prepared (201). The paint color may be shown by a customer, may be a line color presently set to an automobile (this is referred to as a present model color, that is, a mass production color actually on-line), or may be a color selected out of stock colors of a paint company. In any case, a color more approximate to a modified color is used as an original color.

Moreover, an original color is measured by using a multi-angle spectrophotometer. GCMS made by Murakami Color Research Laboratory (incident angle and receiving angle can be changed every degree) as the multi-angle spectrophotometer or MA68 made by US X-Rite Inc. (incident angle −45°, receiving angles are 15°, 25°, 45°, and 110° which are deflection angles from specular reflection) is used as a portable spectrophotometer. Using MA68 is convenient because many colors can be measured in a short time.

Secondly, a computer graphic is prepared by using the above multi-angle spectrophotometer (202). When measuring a reflectance every degree by using GCMS, the CG of paint colors of smooth gradation from highlight (in general, receiving angle ranges between 10° and 15°) up to shade (in general, receiving angle ranges between 75° and 110°) is determined by using JIS Z8701, the measured reflectances are connected into XYZ, XYZ is converted into RGB in accordance with the expression defined by CIE (International Commission on Illumination) for converting XYZ into RGB, RGB points of all angles are calculated, and the RGB points are displayed on a screen.

When using the MA68, which is a portable spectrophotometer, only five RGB points can be obtained because the number of measuring angles is 5. In this case, a computer graphic can be obtained by estimating a reflectance at an optional angle from a regression expression of five angles specified in the method for deciding the optical property of a metallic paint film disclosed in Japanese Patent Application Laid-Open No. 10045/1998 and estimating spectral reflectances from highlight up to shade by an estimating regression expression and then calculating XYZ and RGB.

Thirdly, the reflectance of an original color is computed in order to change the reflectance to various colors and appearances and obtain spectral reflectances of modified colors.

Fourthly, color information and CG on modified colors are displayed (204). Chroma values (Lab*, Lch*), appearance parameters (IV showing brightness of highlight, SV showing lightness of front, and flip-flop value FF showing highlight and front contrast) are suitable as the color information. Moreover, the multi-angle color difference between an original color and a modified color is obtained to display the difference beside the CG of the above original color on a full color monitor.

Fifthly, it is determined whether a color reproducing region is OK (205). A prepared painting process (2C1B or 3-coat) and the "table of upper limits of color reproducing regions" (computer-readable file format) serving as paint films actually painted in every application line of an automobile company are read to check whether the modified color is included in the table. When the modified color is out of the table and it cannot be a real paint color, a modified color is prepared again through the modified-color operation (203). Values IV, FF, Y, and L* for each angle, and c* (metric chroma) and h* (metric hue) as values for specifying upper limits of colors are suitable for appearance parameters to be stored in the color reproducing region.

IV and FF respectively show a change of lightnesses and show a light-and-shade sense through visual observation. When storing IV and FF in a table, FF is delimited every 0.2 and the maximum IV in the delimited FFs is described.

Values Y and L* for every receiving angle specify the lightness or brightness of a modified color (brightness is used when lightness exceeds 100 of white). When storing the data in a table, the maximum value for each angle is described.

The chroma c* and the hue h are used as a pair. The hue circle h* of 360° is separated every approx. 30° and the maximum chroma c* in the hue is described. A receiving angle is sufficient by specifying two angles of highlight (receiving angle of 15°) and front (45°). This is because the highlight 15° characteristically shows the metallic light (in the case of aluminum flake) or interference light (in the case of mica) reflected from a bright material passing through a pigment layer and the front 45° shows the diffused light of a pigment. It is sufficient to check the chroma to the hue of a modified color by two angles. Moreover, the modified color is classified every hue because the range between red and yellow chromatically has a high lightness and high chroma, the range from bluish green to blue and violet has a low lightness and low chroma, and thus the chroma of the upper limit of coloring extremely depends on a color gamut.

When modifying a color by preparing the "table of upper limits of color reproducing region" for every painting process (2C1B, three-coat) and application line of an automobile company, the painting process and application line are specified by a personal computer, the "table of upper limits of the color reproducing region" is read, and whether the color and appearance parameter of the modified paint color is included in the table is calculated at any time. If the parameter is not included in the table, a warning message and a warning tone are output to the monitor of the personal computer to notify an operator that the parameter is not included in the table. Thus, it is possible to prevent a nonrealistic paint color from being prepared on the personal computer.

Sixthly, the image of the paint color of a modified color is determined by the sensibility of a designer (206). If the designer does not like it, a modified color is prepared again by restarting the color-modification operation (203).

Seventhly, the multi-angle reflectance of the decided modified color is stored in the memory of a computer.

Eighthly, an approximate color of the modified color is searched from a color library (208). A more-preferable approximate-color retrieval method can use the method for quickly retrieving an approximate color of a metallic paint color disclosed in Japanese Patent Application Laid-Open No. 2002-259398 (=US Patent Application Laid-Open No. 2002/0084476). Thus, it is possible to obtain an actual paint color of an approximate color to a modified color and present it to a customer.

Ninthly, the modified color is processed through CCM to obtain an estimated formulation (209). By using the already-publicly-known metallic CCM, it is possible to calculate a formulation from the multi-angle spectral reflectance of the modified color. As a specific method, it is possible to use the computer toning apparatus and the paint toning method using the apparatus disclosed in Japanese Patent Application Laid-Open No. 2001-221690 (=US Patent Application Laid-Open No. 2001/036309) or a commercial metallic CCM software.

An algorithm and a procedure are described below which are core portions of the present invention and prepare a modified color from an original color by changing the multi-angle spectral reflectance of a metallic color.

1. Symbol Showing Multi-Angle Spectral Reflectance of Metallic Paint Color

A most secure method for modifying a color is a method for changing a spectral reflectance which is a physical value of a color. A reflectance measured by a goniospectrophotometric colorimeter is shown below.

$R(x,\lambda)$

In this case, R denotes a reflectance which is shown by a reflectance % calibrated by a calibration plate attached to a measuring instrument. Symbol x denotes a receiving angle which is generally shown by a deflection angle from specular reflection. Symbol $\lambda$ denotes a wavelength which is generally shown by 10-nm interval (31 wavelengths) and 20 nm interval (16 wavelengths) in a visible light range of 400 to 700 nm.

Accurately, the variable of an incident angle is further necessary in the reflectance. However, an incident angle is omitted because an incident angle is fixed in a certain measuring system and most units use −45° in accordance with the standard of colorimetry.

The range which can be taken by the receiving angle of x depends on the type of a measuring instrument. For example, the goniospectrophotometric colorimeter GCMS of Murakami Color Research Laboratory can optionally change an incident angle and a receiving angle every degree. However, in the case of the colorimetry of a metallic paint color, an incident angle is generally shown by −45° and a receiving angle is generally shown by a deflection angle from specular reflection and can be measured from 5° to 110° every one degree (normally, every 5° to 10°). In the case of the portable spectrophotometer MA68 made by X-Rite Inc., an incident angle is −45° and the number of receiving angles is five of 15°, 25°, 45°, 75°, and 110°. In the case of a normal paint color, the range from highlights (15°, 25°) to front (45°) and shades (75°, 110°) can be necessarily and sufficiently measured through the above five-angle measurement. The range is generally shown as follows.

x1, x2 . . . xn (i=1, n) Symbol n denotes the number of receiving angles.

The wavelength λ is shown by a 10-nm interval (31 wavelengths) and 20-nm interval (16 wavelengths) between 400 and 700 nm and is generally shown as follows.

λ1, λ2, , , , λm (j=1, m) Symbol m denotes the number of wavelengths.

When summarizing the above, the measured value of a metallic color obtained by a multi-angle spectrophotometer is shown below.

$$R(xi, \lambda j) i=1, n\ j=1, m$$

In this report, the multi-angle spectrophotometer uses MA68 as a model and the following argument develops an expression by assuming n=5 and m=16. That is, the following symbols are obtained.

$$x1=15°, x2=25°, x3=45°, x4=75°, x5=110°$$

$$\lambda 1=400\ nm, \lambda 2=420\ nm, \ldots \lambda 16=700\ nm$$

2. Reflectance Multiplying Method

2.1 Method for Uniformly Multiplying Reflectances of All Angles by a Coefficient k As a method for obtaining the reflectance R' of a new color by changing the reflectance R of an original color, a method for multiplying the original reflectance (x, λ) by a positive actual-number coefficient k is the most simple. As long as a positive actual number is used, a reflectance does not become 0.0 or less and can be applied to an actual color.

$$R'(x,\lambda)=k*R(x,\lambda)$$

When changing a coefficient to be multiplied every receiving angle, the following is shown.

$$R'(xi,\lambda j)=ki*R(xi,\lambda i) i=1,5\ j=1,16 \qquad \text{Expression 1}$$

A method for uniformly multiplying reflectances of all angles by k is to move the reflectance of a metallic paint color in parallel. Chromatically, the brightness Y value is changed in the case of three stimulus values XYZ and the lightness L* is changed in the case of CIE Lab, and the hue and chroma are not greatly changed.

2.2 Method for Changing Coefficient k to be Multiplied on Reflectance for Every Angle When changing a metallic paint color, there is a request for strongly changing highlight or changing only the color of shade. In this case, it is improper to change only the coefficient ki of an angle xi. This is because it is impossible to change only the reflectance of a certain angle in the case of a metallic paint color but the reflectance is continuously changed from highlight up to shade. Therefore, the coefficient k to be multiplied on the reflectance is approximated by a linear function to an angle x. That is, when assuming that a coefficient at highlight of x1 as k1 and a coefficient at shade of x5° as k5, intermediate k2, k3, and k4 are shown below after obtaining an inclinations between x1° and x5°.

$$s=(k5-k1)/(x5-x1) \qquad \text{Expression 2}$$

$$k2=k1+s*(x2-x1)$$

$$k3=k1+s*(x3-x1)$$

$$k4=k1+s*(x4-x1)$$

In general, the following expression is obtained.

$$ki=k1+(xi-x1)*(kn-k1)/(xn-x1)$$

When making the value of the coefficient larger than 1.0, the reflectance increases but when making the value smaller than 1.0, the reflectance decreases. As a result of study, in the case of a range to be changed without losing the appearance of an original color, it is preferable that the change region of k1 and k5 is present between 0.1 and 2.0, more preferably between 0.8 and 1.2. When greatly changing the region, there is a disadvantage in that a color is extremely changed. For example, when assuming x1=0.8 and x5=1.2, intermediate values become x2=0.84, x3=0.93, and x4=1.05.

3. Operation for Changing Metallic Color Shading

3.1 Parameter Showing Shading

In the most basic appearances of metallic paint colors, parameters showing highlight shading and front shading are described. In general, the parameters are known as IV, SV, and FF. When performing measurement by using five angles of MA68, symbols IV68, SV68, and FF68 are used because they are obtained from values measured by MA68. Shading denotes the ratio between the lightness of highlight and the lightness of shade from front. Therefore, the operation of a spectral reflectance is the same as the operation of the reflectance of highlight 15° and the reflectance of shade 75° from front 45°. In fact, when setting a coefficient to be multiplied to 1.0 or more for highlight and 1.0 or less for shade, highlight goes up and shade goes down. Therefore, shading increases and the metallic sense becomes more strong.

IV68 is a parameter among three stimulus values XYZ of k1° (15° in the case of MA68) at the highlight side, SV68 which is a value showing lightness is a parameter among three stimulus values XYZ of k3° of front (45° in the case of MA68), and FF68 which is a Y value showing lightness is a parameter which can be calculated in accordance with IV68 and SV68 by using the following expression.

$$FF68=2\times(IV68-SV68)/(IV68+SV68)$$

IV68 is highlight, that is, lightness nearby supecular reflection, which is a parameter visually felt from lightness to brightness when exceeding 100 of white. As the value increases, stronger luminance is obtained and the metallic sense is strongly felt.

SV68 is the lightness of front. As the value decreases, shade is felt dark from front and the metallic sense is strongly felt.

FF68 is a parameter showing the ratio between lightnesses of highlight and front, that is, the contrast, which can take a value from 0.0 to 2.0. As the value increases, the metallic sense becomes stronger. Generally, a solid paint color containing only a pigment having no directivity can take 0.0 and a silver metallic paint color containing aluminum flake can take 1.6 to 1.8. The Y value used here is a value showing lightness among three stimulus values XYZ, which can be calculated in accordance with the expression specified in JIS Z8701.

3.2 Increasing or Decreasing IV68

To increase IV68, which is the lightness (or brightness) of highlight, intermediate k2, k3, and k4 are obtained from Expression 2 by setting k1 to 1.05 and k5 to 1.0. The new reflectance R' of x1° is obtained from Expression 1. However, it is possible to decrease IV68 by setting k1 to 1/1.05=0.9523 and k5 to 1/1.0=1.0, making the coefficient magnification of highlight smaller than 1.0, obtaining ki of each angle in accordance with Expression 2, and performing calculation in accordance with Expression 1.

Values of k1 and k5 are not restricted to the above values. Though the range between 0.5 and 1.5 is a proper range, approx. 1.05 is proper because a change of brightnesses of highlight is visually remarkable.

To actually change colors on a screen, by executing the command of "IV68 up", R' of a modified color is calculated from Expression 1, chromaticity values CIE Lab*, Lch* of angles and moreover IV68, SV68, and FF68 are displayed on a screen, the color difference from an original color is calculated, the color difference $\Delta E$ of each angle is displayed on the screen, and a CS image is also displayed on the screen.

After executing "IV68 up" once, when the effect is small and the purposed brightness of highlight is not reached, it is possible to execute the command "IV68 up" for the present modified color again. In this case, the coefficient becomes k1=1.05*1.05=1.1025 and IV68 increases whenever executing the command.

3.3 Increasing or Decreasing SV68

To increase SV68 which is the lightness of front, k1 is set to 1.0 and k5 is set to 1.2 but to decrease SV68, k1 is set to 1/1.0 and k5 is set to 1/1.2 to calculate coefficients of intermediate angles in accordance with Expression 2.

3.4 Increasing or Decreasing FF68

To increase shadings of highlight and shade, k1 is set to 1.05 and k5 is set to 0.8 and to decrease them, k1 is set to 1/1.05 and k5 is set to 1/0.8 to calculate coefficients of intermediate angles in accordance with Expression 2.

4. Increasing or Decreasing Chroma

The reflectance of a color having a high chroma has a large reflectance of main wavelength of red or blue and colors other than the above respectively have a small reflectance and the crest and trough of a reflectance have a steep curve. This operation is performed at a reflectance level every receiving angle in accordance with the following procedure.

Procedure for Increasing or Decreasing Chroma

1) The maximum value R (x, max) and minimum value R (x, min) in the wavelength direction at a certain angle x at the present reflectance (x, $\lambda$) are obtained.

2) The middle point between R (x, max) and R (x, min) is calculated and assumed as Rc(x)=[R(x, max)-R(x,min)]/2.

3) A new reflectance Rn in which the crest side is positive and the trough side is negative is prepared by assuming Rc as 0.0 and Rmax side as being positive and the Rmin side as being negative and multiplied by a coefficient k every angle. When the coefficient k is larger than 1.0, the interval between crest and trough increases and stronger chroma is obtained. However, when the coefficient k is smaller than 1.0, the interval between crest and trough decreases and chroma is deteriorated.

$$Rn(x,\lambda)=k*[R(x,\lambda)-Rc(x)]$$

4) By adding Rc to Rn again, a reflectance R' after changing chroma is obtained. In this case, when k is larger than 1.0, R' is negative. Therefore, a minimum reflectance 0.001% which can be measured by a measuring instrument is used.

$$R'(x,\lambda)=Rn(x,\lambda)+Rc(x)$$

$$R'(x,\lambda)>=0.001$$

5) In this case, k every angle is set as shown below.
To raise chromas of all angles from highlight up to shade, k1=k2=k3=k4=k5 are set to 1.05 and to lower them, k1=k2=k3=k4=k5 are set to 1/1.05.

To mainly raise the chroma of highlight, k1 is set to 1.05 and k5 is set to 1.0 to calculate intermediate coefficients k2, k3, and k4 in accordance with Expression 2. However, to lower the chroma of highlight, k1 is set to 1/1.05 and k5 is set to 1.0. Moreover, to raise the chroma of shade, k1 is set to 1.0 and k5 is set to 1.2 and to lower it, k1 is set to 1.0 and k5 is set to 1/1.2.

5. Changing Hues of Colors by Shifting Wavelength

Then, two methods are described as methods for changing hues. A method to be firstly introduced is a method for shifting the wavelength of a reflectance to a tincture of red having a long wavelength (also referred to as red shift) and for shifting the wavelength to a tincture of blue having a short wavelength (also referred to as blue shift). A digital spectrophotometer marketed now measures a visible light region having wavelengths of 400 to 700 nm by a discrete wavelength every 10 or 20 nm to obtain a reflectance. When shifting a wavelength at a wavelength interval measured by this measuring instrument, colors are extremely changed, Therefore, a method is used which moves a wavelength in a unit smaller than a measured wavelength by linearly approximating reflectances R($\lambda$1) and R($\lambda$2) of the $\lambda$1-th wavelength and $\lambda$2-th wavelength and dividing the interval $\lambda$2-$\lambda$1 into p subintervals. Thus, the value obtained by dividing the wavelength interval $\Delta\lambda$ by p becomes a wavelength unit $d\lambda=\Delta\lambda/p$ to be shifted. It is allowed that the fraction size p is an optional positive real number instead of an integer.

It is preferable that values of $d\lambda$ range between −20 nm and +20 nm. When the values exceed the above range, the hue is extremely changed and it cannot then be referred to as color correction. It is more preferable that the values range between −5 nm and +5 nm.

5.1 Shifting to Long Wavelength

It is assumed that there are 16 reflectances measured at a measured wavelength range of 400 to 700 nm and a wavelength interval of 20 nm. It is assumed that these reflectances are R($\lambda$) $\lambda$=1, 16 and divided into five and moved every 20/5=4 nm.

$$R(\lambda)=R(\lambda)+[R(\lambda+1)-R(\lambda)]/5 \quad \lambda=1.15 \qquad \text{Expression 3.1}$$

The final R(16)-th is 700 nm at an end of a long wavelength and R(16+1)=R(17)-th is not present. Therefore, in this case, R(16) is not moved.

5.2 Shifting to Short Wavelength $$R(\lambda)=R(\lambda)+[R(\lambda-1)-R(\lambda)]/5 \quad \lambda=2.16 \qquad \text{Expression 3.2}$$

First $R(1)$ is 400 nm at an end of a short wavelength and $R(1-1)=R(0)$-th is not present. Therefore, in this case, $R(1)$ is not moved.

In this case, to change the shift of a color every angle, it is necessary to change the fraction size p. That is, the fraction size p is small, a wavelength is largely moved and resultantly, the shift of a color becomes large. For example, when shifting a wavelength uniformly every 4 nm of all of five angles, the fraction size p1 of x1 angle, the fraction size p2 of x2 angle, . . . , and fraction size p5 of x5 angle are set to the same value. If a wavelength interval dL is 20 nm, the following expression is effected because 20 nm/5=4 nm.

$$p1=p2=p3=p4=p5=5$$

To mainly change highlight, the fraction size of an angle at the highlight side is decreased, the fraction size at the shade side is increased, and fraction sizes of wavelengths of angles between the highlight side and the shade side are obtained from proportional Expression 2. For example, when setting p1=2 and p5=10 and assuming the wavelength interval $\Delta\lambda$ as 20 nm, the angle x1 at the highlight side is shifted by 20 nm/2=10 nm and the angle x5 at the shade side is shifted by 20/10=2 nm. Moreover, to mainly change the shade side, the fraction size of an angle at the highlight side is increased and the fraction size at the shade side is decreased. For example, when setting p1=10 and p5=2 the angle x1 at the highlight side is shifted by 20 nm/2 nm and the angle x5 at the shade side is shifted by 20/2=10 nm.

6. Changing Color Tincture by Multiplying by Color Filter

6.1 Multiplying by Color Filter

Another method for changing color tincture is a method for multiplying an original reflectance by a color filter. $Fr(\lambda)$, $Fg(\lambda)$, $Fb(\lambda)$, and $Fy(\lambda)$ are prepared which are color filters of r, g, b, and y of red, green, blue, and yellow and multiplied by an original reflectance $R(\lambda)$ to obtain a new color $R'(\lambda)$. For example, to obtain red tincture, the following expression is used.

$$R'(x,\lambda)=R(x,\lambda)*Fr(\lambda)$$

These color filters are prepared as shown below.

6.2 How to Make a Color Filter

It is allowed to theoretically prepare any color as the color of a color filter. However, to calculate a formulation for a reflectance after modifying a color by using CCM in a subsequent step, it is better to prepare the color by a pigment used for a paint. Therefore, a color having a high chroma and a low lightness, that is, having a high color purity of the main wavelength is selected from the color sample book of a JAPAN PAINT MANUFACTURERS ASSOCIATION. In accordance with the reflectance of the color, for example in the case of red, a coefficient vector having a coefficient of 1.1 in a range of the main wavelength of approx. 600 to 700 nm and a coefficient of 400 to 500 nm having no wavelength component and a value of 0.9 to 1.0 is prepared and used as a color filter. Any color chart is suitable for the model reflectance used to prepare a color filter. However, a color sample book prepared by paints (e.g. Standard Paint Colors and Autocolors issued by JAPAN PAINT MANUFACTURERS ASSOCIATION) is suitable.

Thus, the value of the coefficient vector of a color filter has a shape in which a model reflectance is compressed between 0.9 and 1.1. This is because when directly using the model reflectance, the main wavelength has a high reflectance but wavelengths other than the main wavelength have a reflectance of 0.1% or less, and when multiplying the original reflectance by the reflectance, the reflectance of an original color is extremely decreased and a color change increases. That is, because the original color is not killed, but red tincture is slightly added to the original color, it is realistic to use a method for multiplying the main wavelength by a coefficient larger than 1.0 and other wavelengths by a coefficient slightly smaller than 1.0, preferably a coefficient vector in a range of 0.9 to 1.1.

6.3 Strength of Color Filter Every Angle

To change color tinctures of all angles, it is sufficient to multiply the original reflectance $R(x,y)$ by a color filter $F(\lambda)$ without depending on a receiving angle. However, to change a pigmentation degree every angle, it is necessary to use a method for preparing a new color filter obtained by using the above described <Procedure for changing chroma> and thereby changing (extending or compressing) the crest and trough of the coefficient of the color filter $F(\lambda)$ to k times by the coefficient of each angle and multiplying the original reflectance $R(x,\lambda)$ by the new color filter.

7. Color Mixing

7.1 Reflectance Mixing Method

A method for mixing a certain reflectance with another reflectance is simply shown by the following expression.

$$R'(x,\lambda)=c1*R(x,\lambda)+c2*W(x,\lambda)$$

In this case, a concentration ratio is $c1+c2=1.0$. W denotes the reflectance of a paint color to be mixed every angle. According to the KS theory, it is known that there is additivity in the KS value of a color material but there is no additivity between reflectances. However, it is possible to modify a color comparatively fitted to a design image even for the addition according to a blending ratio between reflectances, and this is sufficient for this purpose. For example, by mixing the reflectance of silver metallic with that of blue solid, high brightness from an aluminum flake can be seen for highlight and diffused light from a blue pigment can be seen for shade and the design image is fitted.

7.2 Intensity of Mixed Color Every Angle

To change the intensity of a mixed color every receiving angle, the following expression is obtained by simply considering that a mixing ratio c2 is changed in accordance with a coefficient k.

$$R'(x,\lambda)=c1*R(x,\lambda)+(c2*k)*W(x,\lambda)$$

In this case, a concentration ratio is set to $c1+kc2=1.0$.

To perform many color mixings for highlight when k is weighted every receiving angle in the above expression, k at an intermediate angle in the expression * is obtained by setting k1 to 1.1 and k5 to 0.9 in a condition k1>k5.

To perform many color mixings for shade, k1 is set to 0.9 and k5 is set to 1.1 in a condition of k5>k1.

For example, to add the reflectance of another color by c2=0.2 part, a large quantity of the reflectance to highlight, and a small quantity of the reflectance to shade, when setting k1 to 1.1 and k5 to 0.9, 2*1.1=0.22 is added in the case of a receiving angle x1 and 0.2*0.9=0.10 is added in the case of a receiving angle x5.

EXAMPLES

Program Operating Screen

FIG. 3 shows the main screen of a program for changing the appearance of a prepared metallic paint color. There is a menu for modifying a color at the bottom left of the screen, modified IV68, SV68, and FF68 are displayed at the top left, hue h* and chroma c* of highlight 15° and front 45° are displayed below the IV68, SV68, and FF68, and an error is displayed below the hue h* and chroma c* when a color gamut is exceeded after checking a modified color in accordance with the "table of upper limits of color reproducing regions". CS images of an original color and a modified color are displayed at the right side so that the difference between appearances can be visually evaluated at the same time.

Preparation for Original Color C1

A carbon black pigment is added to aluminum flakes having a medium grain diameter (average grain diameter of 14 μm), a paint color of aluminum flake 15PHR (weight of color material to resin 100) and carbon 5PHR is prepared to paint it on an intermediate coat plate until it is completely hidden, and then a clear paint is painted through wet on wet, and finally a color card hardened at 140° for 30 min is obtained to use the color card as an original color (symbol C1). Because this study is an appearance change method based on the colorimetry, a solvent-type, aqueous-type, baking-type, and normally-dry-type paint can be used. To prepare a subsequent paint color sample, the pigment concentration of a color material is merely described by PHR without designating the type and hardening type of a paint.

Preparation for Original Color C2

A dark-red-mica original color C2 is prepared by mixing 6.86 PHR of a quinacridone violet pigment, 1.81 PHR of carbon black, and 10.08 PHR of colored interference gold mica are mixed to prepare the original color C2 of a dark red mica color.

Preparation for Original Color C3

The original color C3 of a silver metallic color containing 20 PHR of aluminum flakes having a medium grain diameter is prepared.

The original colors prepared as described above are measured by a portable five-angle spectrophotometer (MA68 made by X-Rite Inc). Table 1 shows measured values.

TABLE 1

List of color measured values of prepared original color and modified colors,

Table 1-1

| Name | IV68 | SV68 | FF68 |
|---|---|---|---|
| C1 (Original color) | 36.6 | 7.7 | 1.31 |
| C1-1' (Modified color) | 44.5 | 8.8 | 1.34 |
| C1-2' (Modified color) | 36.6 | 9.8 | 1.15 |
| C1-3' (Modified color) | 44.5 | 6.8 | 1.47 |

| Name | Receiving angle | L* | a* | b* | c* | h* |
|---|---|---|---|---|---|---|

Table 1-2

| | | | | | | |
|---|---|---|---|---|---|---|
| C2 (Original color) | 15 | 24.5 | 36.4 | 5.5 | 36.8 | 8.6 |
| C2 (Original color) | 25 | 15.8 | 27.3 | 4.2 | 27.6 | 8.8 |
| C2 (Original color) | 45 | 5.8 | 12.7 | 1.7 | 12.8 | 7.7 |
| C2 (Original color) | 75 | 3.6 | 5.1 | 0.9 | 5.2 | 9.6 |
| C2 (Original color) | 110 | 3.1 | 3.8 | 0.6 | 3.8 | 8.8 |
| C2-1' | 15 | 22.0 | 43.2 | 7.2 | 43.8 | 9.4 |
| C2-1' | 25 | 14.1 | 32.0 | 5.3 | 32.5 | 9.4 |
| C2-1' | 45 | 5.5 | 14.0 | 1.9 | 14.1 | 7.7 |
| C2-1' | 75 | 3.7 | 5.7 | 1.0 | 5.8 | 9.6 |
| C2-1' | 110 | 3.2 | 4.2 | 0.7 | 4.2 | 8.9 |
| C2-2' | 15 | 26.4 | 31.2 | 4.5 | 31.5 | 8.2 |
| C2-2' | 25 | 17.1 | 23.6 | 3.5 | 23.9 | 8.4 |
| C2-2' | 45 | 6.0 | 11.5 | 1.5 | 11.6 | 7.6 |
| C2-2' | 75 | 3.5 | 4.7 | 0.8 | 4.7 | 9.7 |
| C2-2' | 110 | 3.0 | 3.4 | 0.5 | 3.5 | 8.8 |
| C2-3' | 15 | 27.1 | 35.5 | 11.6 | 37.3 | 18.1 |
| C2-3' | 25 | 17.7 | 26.6 | 8.7 | 28.0 | 18.2 |
| C2-3' | 45 | 6.5 | 12.6 | 3.6 | 13.1 | 15.8 |
| C2-3' | 75 | 3.9 | 4.7 | 1.7 | 5.0 | 20.1 |
| C2-3' | 110 | 3.3 | 3.2 | 1.3 | 3.5 | 21.6 |
| C2-4' | 15 | 22.8 | 32.7 | 1.9 | 32.8 | 3.2 |
| C2-4' | 25 | 14.5 | 24.5 | 1.4 | 24.6 | 3.3 |
| C2-4' | 45 | 5.3 | 10.9 | 0.3 | 10.9 | 1.7 |
| C2-4' | 75 | 3.4 | 4.8 | 0.0 | 4.8 | 359.6 |
| C2-4' | 110 | 2.9 | 3.7 | −0.2 | 3.7 | 356.5 |

TABLE 1-3

| | | | | | | |
|---|---|---|---|---|---|---|
| C3 (Original color) | 15 | 126.0 | −0.3 | −0.6 | 0.7 | 247.6 |
| C3 (Original color) | 25 | 103.7 | −0.9 | −0.5 | 1.0 | 212.1 |
| C3 (Original color) | 45 | 64.6 | −0.7 | −1.5 | 1.6 | 244.2 |
| C3 (Original color) | 75 | 40.3 | −0.7 | −1.5 | 1.6 | 243.5 |
| C3 (Original color) | 110 | 32.9 | −0.9 | −1.6 | 1.8 | 240.8 |
| C3-1' | 15 | 125.4 | 4.5 | 2.5 | 5.2 | 29.0 |
| C3-1' | 25 | 103.1 | 3.2 | 2.1 | 3.8 | 33.3 |
| C3-1' | 45 | 64.2 | 2.0 | 0.3 | 2.0 | 9.0 |
| C3-1' | 75 | 40.0 | 1.1 | −0.2 | 1.1 | 348.0 |
| C3-1' | 110 | 32.7 | 0.7 | −0.5 | 0.9 | 324.5 |
| C3-2' | 15 | 129.4 | −4.0 | −4.0 | 4.2 | 5.8 | 133.3 |
| C3-2' | 25 | 106.5 | −4.0 | 3.5 | 5.3 | 138.6 |
| C3-2' | 45 | 66.5 | −2.8 | 1.3 | 3.1 | 155.5 |
| C3-2' | 75 | 41.6 | −2.2 | 0.5 | 2.3 | 168.7 |
| C3-2' | 110 | 34.1 | −2.2 | 0.1 | 2.2 | 177.7 |
| C3-3' | 15 | 126.0 | −2.9 | −7.2 | 7.8 | 248.0 |
| C3-3' | 25 | 103.7 | −3.1 | −6.1 | 6.8 | 243.0 |
| C3-3' | 45 | 64.6 | −2.2 | −5.2 | 5.6 | 247.3 |
| C3-3' | 75 | 40.3 | −1.7 | −4.1 | 4.4 | 246.9 |
| C3-3' | 110 | 33.0 | −1.8 | −3.9 | 4.2 | 245.6 |
| C3-4' | 15 | 127.5 | 1.9 | 7.2 | 7.4 | 75.5 |
| C3-4' | 25 | 104.9 | 0.9 | 6.0 | 6.1 | 81.3 |
| C3-4' | 45 | 65.4 | 0.5 | 3.0 | 3.0 | 81.4 |
| C3-4' | 75 | 40.8 | 0.1 | 1.6 | 1.6 | 87.9 |
| C3-4' | 110 | 33.4 | −0.2 | 1.1 | 1.1 | 100.4 |
| C3-5' | 15 | 116.7 | −1.0 | −3.2 | 3.3 | 251.9 |
| C3-5' | 25 | 96.3 | −1.9 | −4.1 | 4.5 | 245.5 |
| C3-5' | 45 | 61.4 | −2.9 | −8.6 | 9.0 | 251.2 |
| C3-5' | 75 | 41.4 | −4.7 | −13.7 | 14.5 | 250.9 |
| C3-5' | 110 | 35.8 | −5.7 | −15.4 | 16.5 | 249.7 |
| C3-6' | 15 | 122.2 | −0.7 | −5.7 | 5.7 | 263.0 |
| C3-6' | 25 | 102.4 | −1.1 | −1.6 | 1.9 | 235.3 |
| C3-6' | 45 | 66.6 | 2.0 | 2.5 | 3.2 | 52.1 |
| C3-6' | 75 | 48.0 | 2.5 | 6.6 | 7.1 | 69.3 |
| C3-6' | 110 | 45.0 | 0.5 | 8.8 | 8.8 | 86.8 |
| C3-7' | 15 | 98.4 | 0.5 | 1.7 | 1.7 | 74.3 |
| C3-7' | 25 | 80.0 | −0.2 | 0.9 | 1.0 | 103.5 |
| C3-7' | 45 | 48.4 | −0.4 | −0.6 | 0.7 | 240.9 |
| C3-7' | 75 | 29.0 | −0.5 | −1.0 | 1.1 | 243.7 |
| C3-7' | 110 | 23.1 | −0.7 | −1.2 | 1.4 | 241.2 |

Preparation for Color Filter

Figure 4:
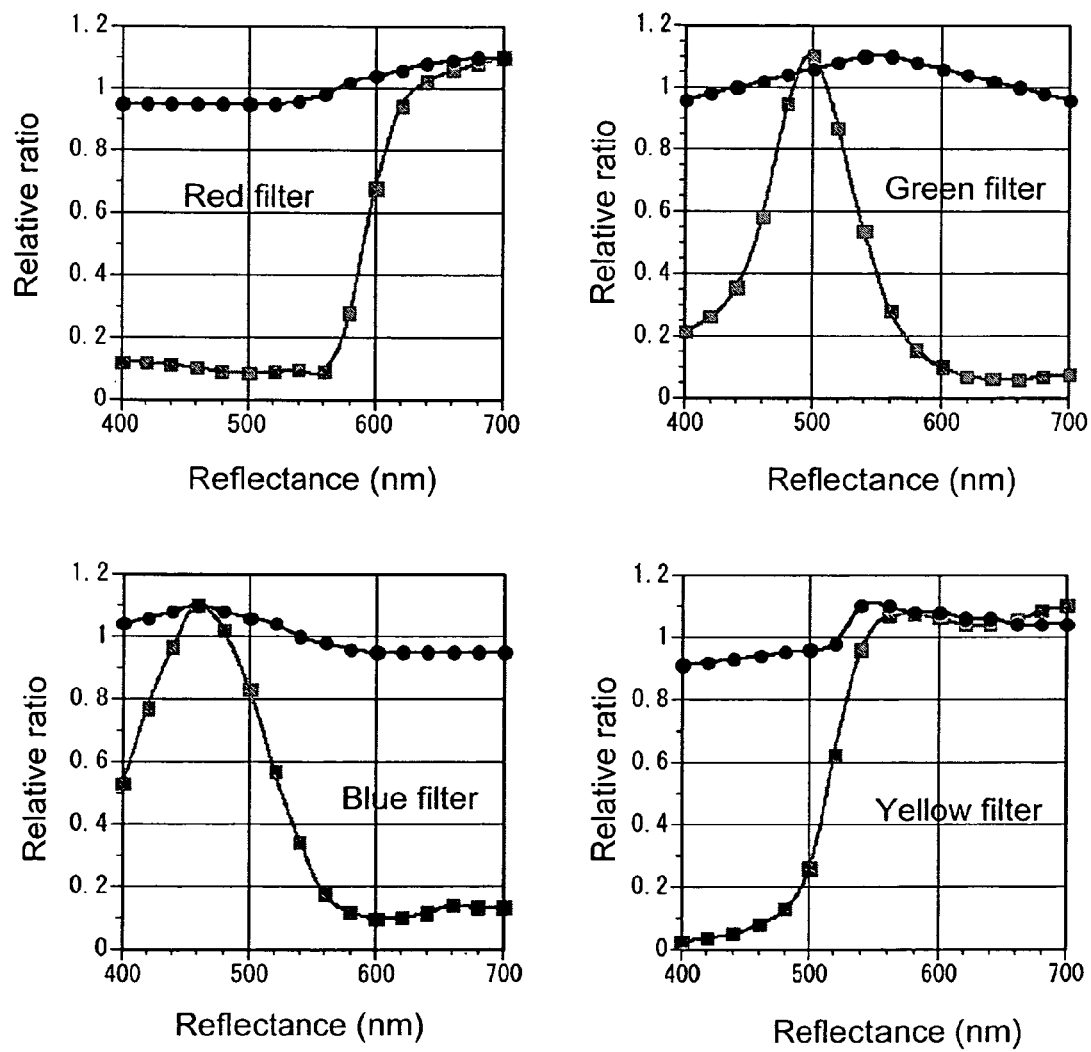
FIG. 4 is an illustration showing graphs of prepared color filters.

The following colors are selected from Standard Paint Colors T series of Japan Paint Manufactures Association, measured by MA68 of X-Rite Inc. to sample a reflectance of 45°. Color filters having a coefficient in a range of 0.9 to 1.1 in the wavelength direction are prepared and shown in FIG. 4. In the case of a red filter (red), a coefficient is decided so that the shape becomes the same as the reflectance curve of red by referring to T05-50V. In the case of a green filter (green) is prepared by referring to T55-30L, a blue filter (blue) is prepared by referring to T72-40t, and a yellow filter (yellow) is prepared by referring to T25-80W (FIG. 4).

Preparation for Another Paint Color for Mixing

The following three colors are prepared and their color measured values are shown in Table 2.

TABLE 2

List of chromaticity values of paint colors for mixing

| Name | Receiving angle | L* | a* | b* | c* | h* |
|---|---|---|---|---|---|---|
| W1 | 15 | 45.3 | −20.2 | −42.4 | 47.0 | 244.6 |
| W1 | 25 | 45.1 | −19.9 | −43.0 | 47.3 | 245.2 |
| W1 | 45 | 44.8 | −19.9 | −43.2 | 47.5 | 245.3 |
| W1 | 75 | 45.6 | −19.1 | −43.2 | 47.3 | 246.2 |
| W1 | 110 | 45.0 | −19.2 | −42.4 | 46.5 | 245.6 |
| W2 | 15 | 104.2 | −3.2 | −30.3 | 30.5 | 263.9 |
| W2 | 25 | 96.8 | −2.2 | −6.2 | 6.5 | 250.6 |
| W2 | 45 | 73.8 | 10.4 | 17.1 | 20.0 | 58.7 |
| W2 | 75 | 68.1 | 8.4 | 24.5 | 25.9 | 71.1 |
| W2 | 110 | 71.2 | 2.3 | 25.9 | 26.0 | 84.9 |
| W3 | 15 | 34.3 | 6.7 | 33.3 | 34.0 | 78.6 |
| W3 | 25 | 22.5 | 5.3 | 25.0 | 25.6 | 78.0 |
| W3 | 45 | 6.7 | 2.9 | 7.4 | 7.9 | 68.9 |
| W3 | 75 | 2.0 | 0.6 | 1.1 | 1.3 | 62.5 |
| W3 | 110 | 1.4 | 0.1 | 0.1 | 0.2 | 43.4 |

Preparation for Paint Color W1 for Mixing

Clear solid color prepared by phthalocyanine blue and titanium white

Preparation for Paint Color W2 for Mixing

See-through color obtained by painting interference blue mica color on white substrate Preparation for Paint Color W3 for Mixing Dark gold mica color obtained by mixing colored gold mica color and carbon black Preparation for Upper Limit of Color Reproducing Region A table of upper limits of color reproducing regions is prepared which is used to determine whether a modified color can be painted in an actual plant. Table 3 is a table showing a result of examining upper limits of color developments by analyzing approx. 3,000 paint colors painted in the past in the application line of plant A of a certain user when the paint color preparing step is 2C1B process. Table 3-1 specifies the maximum lightness which can be taken every receiving angle as Y and L*. Table 3-2 specifies the maximum IV68 in flip flop FF68 by delimiting the flip flop FF68 every 0.2 stage. Table 3-3 shows the maximum chroma which can be taken in the hue h* at highlight x1=15° by delimiting the hue h* every 30°. Because the hiding power is deteriorated when chroma is high, this value is an important index which becomes a problem at each time in the conflict between the chroma of color appearance/designing appearance and the technique of paint color design because the hiding power is deteriorated when chroma is high.

TABLE 3

Light of upper limits of color reproducing regions

TABLE 3-1

| Receiving angle | Y | L* |
|---|---|---|
| 15 | 300 | 160 |
| 25 | 150 | 120 |
| 45 | 80 | 90 |
| 75 | 80 | 90 |

TABLE 3-2

| FF68 | IV68 |
|---|---|
| 0.0-0.2 | 90 |
| 0.2-0.4 | 70 |
| 0.4-0.6 | 80 |
| 0.6-0.8 | 90 |
| 0.8-1.0 | 110 |
| 1.0-1.2 | 160 |
| 1.2-1.4 | 220 |
| 1.4-1.6 | 260 |
| 1.6-1.8 | 290 |
| 1.8-2.0 | 280 |

TABLE 3-3

| h* | c* − 15° | c* − 45° |
|---|---|---|
| 0-30 | 80 | 60 |
| 30-60 | 110 | 70 |
| 60-90 | 110 | 80 |
| 90-120 | 110 | 70 |
| 120-150 | 90 | 60 |
| 150-180 | 90 | 60 |
| 180-210 | 90 | 40 |
| 210-240 | 80 | 40 |
| 240-270 | 80 | 40 |
| 270-300 | 80 | 50 |
| 300-330 | 70 | 40 |
| 330-360 | 60 | 40 |

Experiment for Changing Shading (IV68, SV68, and FF68)

The processing for individually changing three appearance parameters of IV68, SV68, and FF68 is applied to five-angle spectral reflectances measured by the five-angle spectrophotometer MA68 of X-Rite Inc. in US in accordance with the method of <Procedure 3>. Therefore, symbols of coefficients to be multiplied on a receiving angle and reflectance can be defined as shown below.

| | | |
|---|---|---|
| Highlight | x1 = 15° | Coefficient k1 (Lightness value Y is referred to as IV68.) |
| Highlight | x2 = 25° | Coefficient k2 |
| Front | x3 = 45° | Coefficient k3 (Lightness Y value is referred to as SV68.) |
| Shade | x4 = 75° | Coefficient k4 |
| Shade | x5 = 110° | Coefficient k5 |

To increase IV68, modified colors are prepared by using Expressions 1 and 2 and setting the coefficient k1 to be multiplied on the reflectance of the receiving angle x1=15° to 1.05 and the coefficient k5 to be multiplied on the reflectance of the receiving angle x5=110° to 1.0. In the case of these paint colors, desired appearance cannot be obtained by one-time modification operation. Therefore, a modified color C1-1' is obtained by repeating the above operation four times. Because the processing is repeated four times, the changed reflectance R' of x1=15° resultantly becomes 1.05^4*R, that is, 1.22*R. Appearance calculation results are obtained from Table 1-1 as shown below.

| Original color C1 | IV68 = 36.6, SV68 = 7.7, FF68 = 1.31 |
|---|---|
| Modified color C1-1' | IV68 = 44.5, SV68 = 8.8, FF68 = 1.34 |

Figure 5:
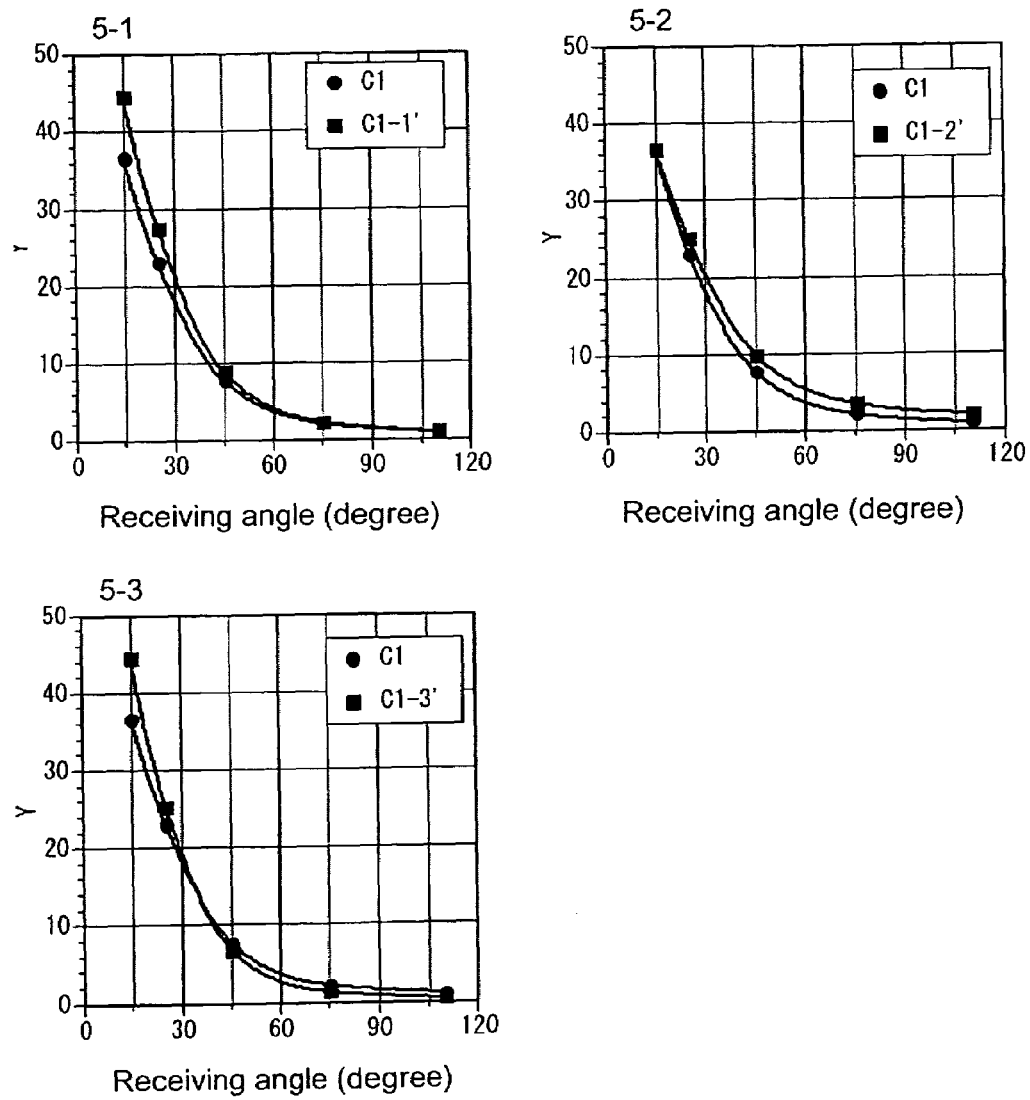

Moreover, graphs are shown in FIG. 5-1. From FIG. 5-1, the purposed appearance is obtained in which IV68 of a modified color is preferentially increased.

To increase SV68 which is the lightness of front of an original color (SV is Y value of 45°), k1 is set to 1.0 and k5 is set to 1.2 and calculation is performed by using Expressions 1 and 2 to obtain a modified color C1-2'. The number of repetitions of the calculation is four. Therefore, the changed reflectance R' becomes 1.2^4*R, that is, 2.07*R. at the angle of x5. Appearance calculation results are obtained as shown below.

| Original color C1 | IV68 = 36.6, SV68 = 7.7, FF68 = 1.31 |
|---|---|
| Modified color C1-2' | IV68 = 36.6, SV68 = 9.8, FF68 = 1.15 |

Figure 2:
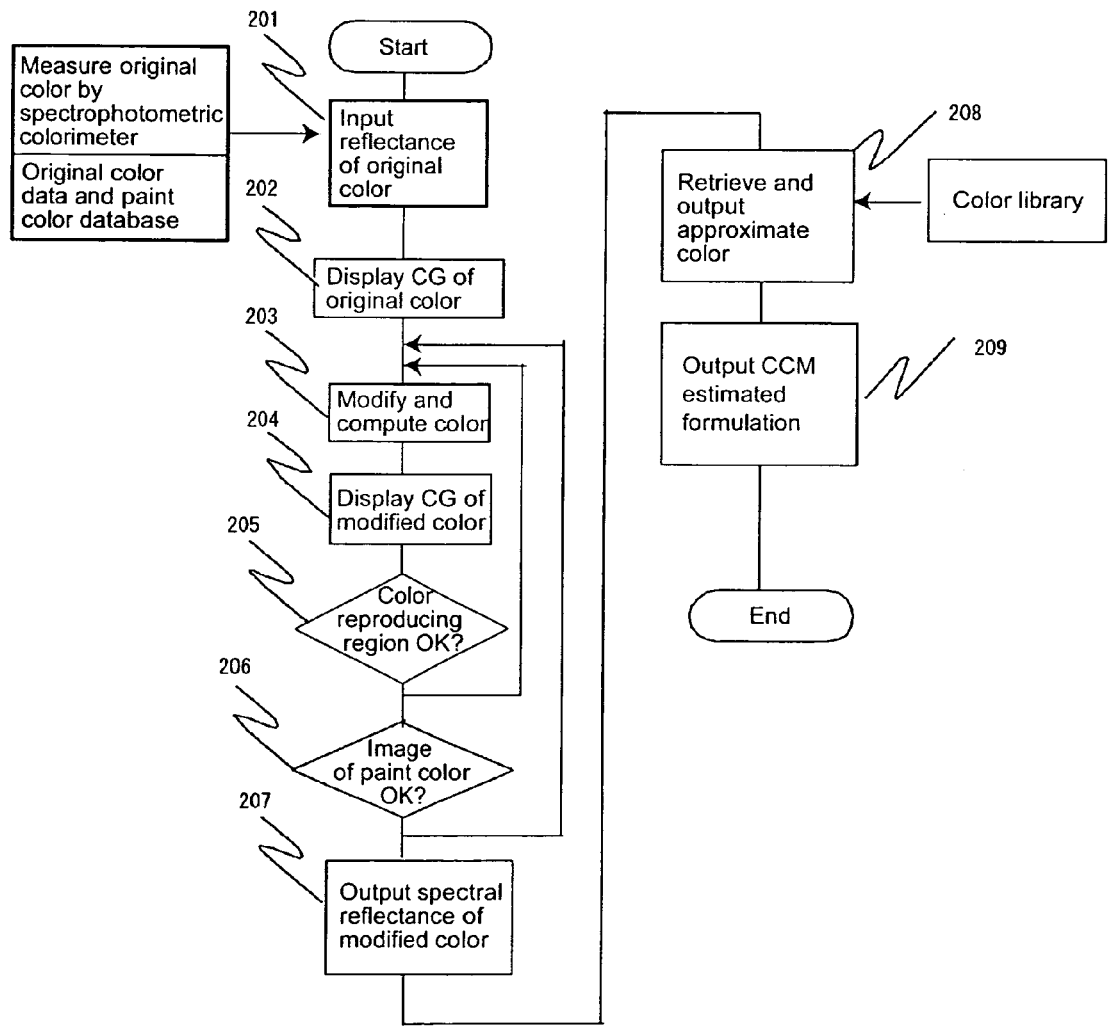
FIG. 2 is a flowchart of the present invention.

Moreover, graphs are shown in FIG. 5-2. From FIG. 5-2, the purposed appearance of the modified color is obtained in which IV value is not changed, SV value and V value at the shade side are increased, and FF68 is decreased.

To increase FF68, it is appropriate to use a method for increasing IV68 of an original color and decreasing SV68. The coefficient k1 is set to 1.05 and k5 is set to 0.8 and calculation is performed by using Expressions 1 and 2 to obtain a modified color C1-3'. The number of repetitions of the calculation is four. Therefore, the changed reflectance R' becomes 1.05^4*R, that is, 1.22 times at the angle of x1 and becomes 0.8^4*R, that is, 0.41 times at the angle of x5. Appearance calculation results are obtained from Table 1-1 as shown below.

| Original color C1 | IV68 = 36.6, SV68 = 7.7, FF68 = 1.31 |
|---|---|
| Modified color C1-3' | IV68 = 44.5, SV68 = 6.8, FF68 = 1.47 |

Moreover, graphs are shown in FIG. 5-3. From FIG. 5-3, in the case of a modified color, IV value is increased, SV value is decreased, and FF value is increased.

Experiment for Changing Chroma

To increase chromas of all angles of the original color C2, magnification coefficients of angles are set to k1=k2=k3=k4=k5=1.05 to prepare a modified color C2-1'in accordance with the <procedure for changing chroma>. Moreover, to decrease chroma, k1=k2=k3=k4=k5 are set to 1/1.05 to prepare a modified color C2-2'. Lch* at highlight x1=15° is shown below. It is found that the hue h* is almost constant and only the chroma c* changes. Table 1-2 shows chromaticity values of five angles. When comparing the chromaticity values by highlight of 15°, the following data is obtained.

| Original color C2 | $L^* = 24.5$ | $c^* = 36.8$ | $h^* = 8.6$ |
|---|---|---|---|
| Modified color C2-1' | $L^* = 22.0$ | $c^* = 43.8$ | $h^* = 9.4$ |
| Modified color C2-2' | $L^* = 26.4$ | $c^* = 31.5$ | $h^* = 9.2$ |

Figure 6:
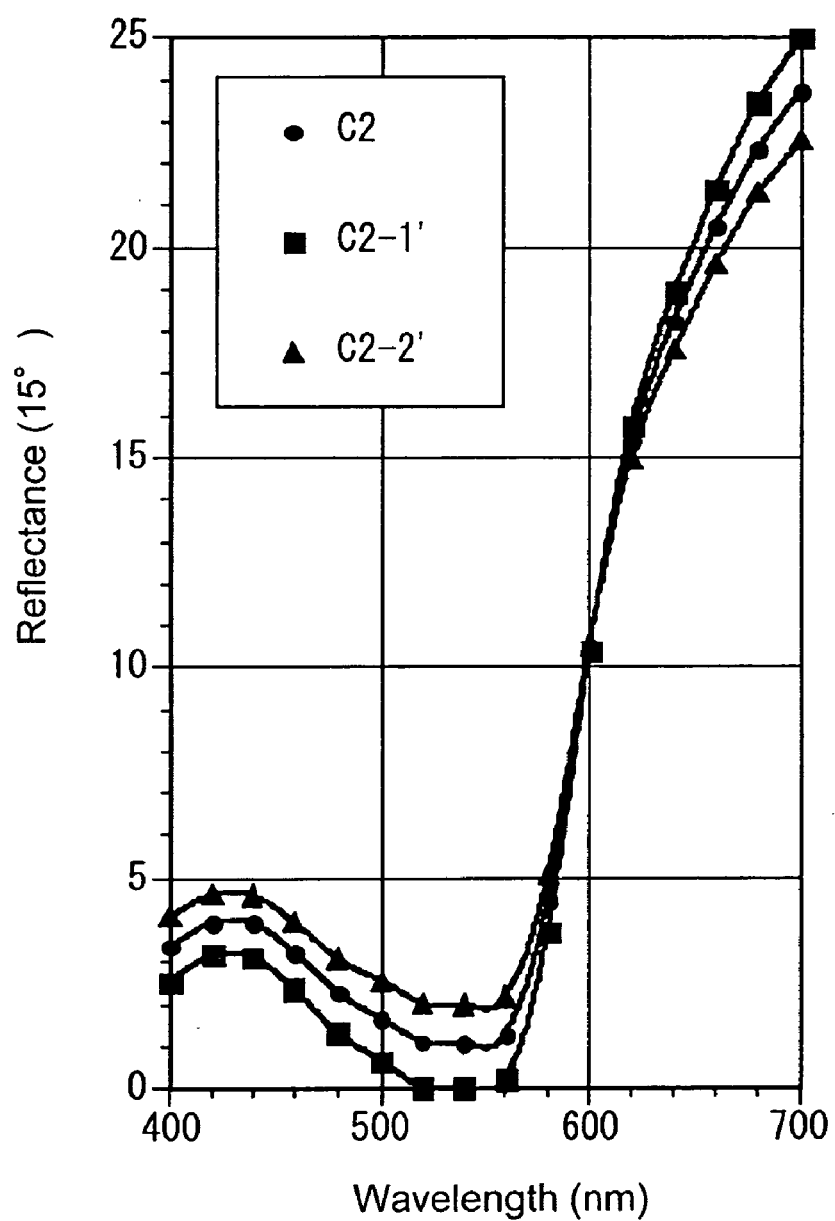
FIG. 6 is an illustration showing graphs of medium-chroma red mica colors obtained by changing chromas.

Moreover, graphs are shown in FIG. 6. From FIG. 6, it is found that crest and trough of the reflectance of a color in which chroma is increased are enlarged. Moreover, widths of crest and trough of the reflectance of a color in which chroma is decreased are decreased.

Experiment for Changing Color Tincture by Shifting Wavelength

The original color C2 is used to mainly change hue by shifting wavelength. To shift wavelengths of all angles, a modified color C2-4'is prepared by setting magnification coefficients of angles to k1=k2=k3=k4=k5=1.0, shifting the magnification coefficients to the wavelength side by +4 nm to prepare a modified color C2-3'whose red tincture is further strengthened by shifting it to the wavelength side by +4 nm and a modified color C2-4'made into blue tincture by shifting it to the short-wavelength side by −4 nm.

Lch* at highlight x1=15° is shown below. It is found that hue h* is changed. Table 1-2 shows chromaticity values of five angles. As a result of comparing the chromaticity values at highlight of 15°, the following data is obtained.

| Original color C2 | $L^* = 24.5$ | $c^* = 36.8$ | $h^* = 8.6$ |
|---|---|---|---|
| Modified color C2-3' | $L^* = 27.1$ | $c^* = 37.3$ | $h^* = 18.1$ |
| Modified color C2-4' | $L^* = 22.8$ | $c^* = 32.7$ | $h^* = 3.2$ |

Figure 7:
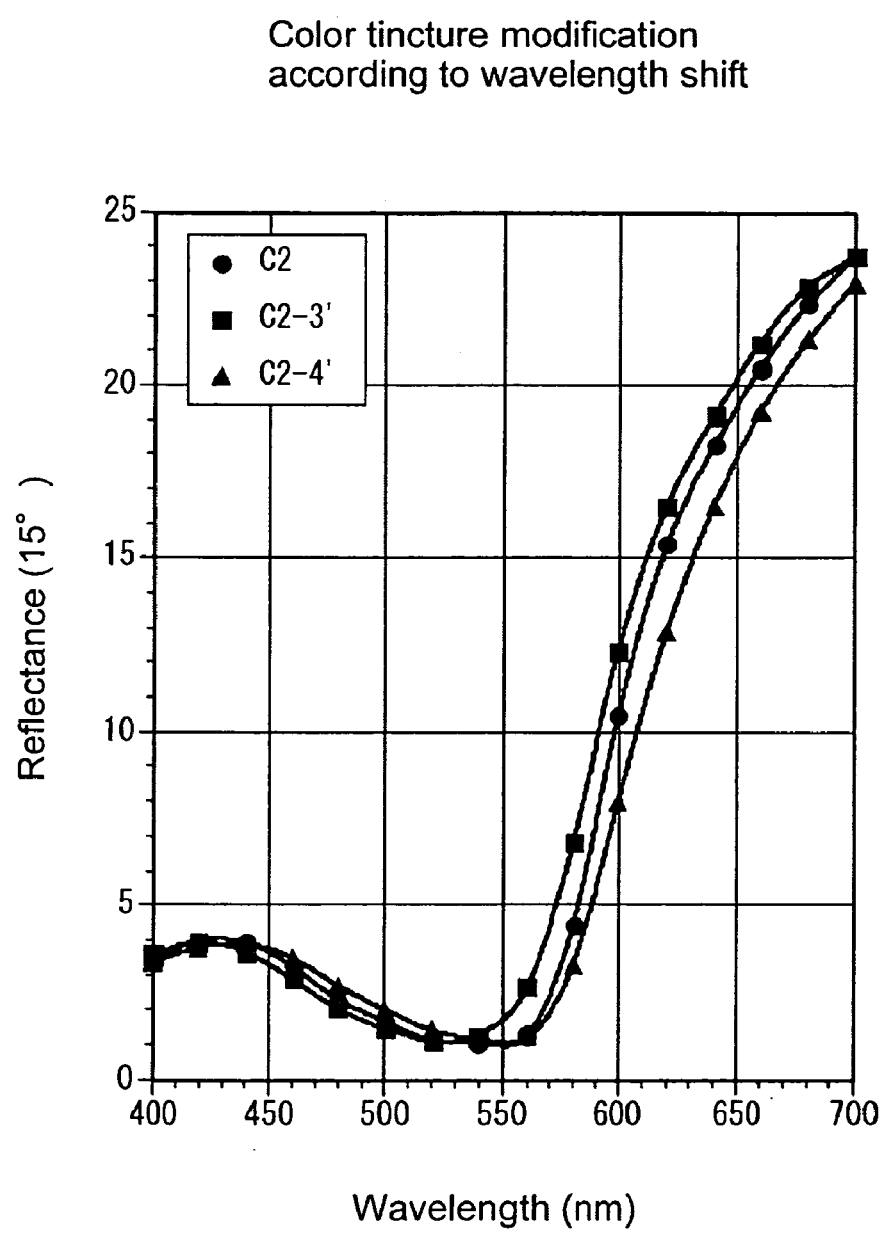
FIG. 7 is an illustration showing graphs of medium-chroma red mica colors obtained by shifting a wavelength and changing hues.

Moreover, graphs are shown in FIG. 7. From FIG. 7, it is found that a wavelength is shifted to long wavelength and short wavelength from the original color.

Experiment for Changing Color Tincture by Multiplying by Color Filter

An experiment for changing a color by multiplying the silver metallic color of the original color C3 by a color filter is performed. Modified colors C3-1'(red), C3-2'(green), C3-3'(blue), and C3-4'(yellow) are prepared by multiplying the original color C3 by a color filter by setting all angles to the same coefficient magnifications k1=k2=k3=k4=k5=1.0. Lch* at highlight x1=15° is shown below. It is found that the chroma c* and hue h* are expectedly changed. Table 1-3 shows chromaticity values of five angles. As a result of comparison at highlight of 15°, the following data is obtained.

| Original color C3 | $L^* = 126.0$ | $c^* = 0.7$ | $h^* = 247.6$ |
|---|---|---|---|
| Modified color C3-1' | $L^* = 125.4$ | $c^* = 5.2$ | $h^* = 29.0$ |
| Modified color C3-2' | $L^* = 129.4$ | $c^* = 5.8$ | $h^* = 133.3$ |
| Modified color C3-3' | $L^* = 126.0$ | $c^* = 7.8$ | $h^* = 248.0$ |
| Modified color C3-4' | $L^* = 127.5$ | $c^* = 7.4$ | $h^* = 75.5$ |

Moreover, graphs are shown in FIG. 8-1 to 8-5. FIG. 8-1 shows spectral reflectances of five angles of the silver metallic of the original color C3. FIG. 8-2 shows results of C3-1'obtained by being multiplied by a red filter, FIG. 8-3 shows results of C3-2'obtained by being multiplied by a green filter, FIG. 8-4 shows results of C3-3'obtained by being multiplied by a blue filter, and FIG. 8-5 shows results of C3-4'obtained by being multiplied by a yellow filter. From FIGS. 8-1 to 8-5, it is found that each of the reflectances of modified colors has a shape obtained by multiplying the neutral silver metallic color of the original color C3 by a color filter.

Experiment for Changing Appearance by Mixing Another Color

To mix colors, spectral reflectances of paint colors W1, W2, and W3 for mixing are mixed with the spectral reflectance of the original color C3 at the following ratios of 0.2 to 0.5.

| | |
|---|---|
| Modified color C3-5' = | 0.8 * C3 + 0.2 * W1 |
| Modified color C3-6' = | 0.8 * C3 + 0.2 * W2 |
| Modified color C3-7' = | 0.5 * C3 + 0.5 * W3 |

Table 1-3 shows chromaticity values of five angles and FIGS. 9-1 to 9-4 show graphs. FIG. 9-1 shows spectral reflectances of five angles of the original color C3. FIG. 9-2 shows C3-5'mixed with W1, FIG. 9-3 shows C3-6'mixed with W2, and FIG. 9-4 shows C-7'mixed with W3. From FIGS. 9-1 to 9-4, it is found that reflectances of modified colors have shapes obtained by multiplying the neutral silver metallic color of the original color C3 by mixed colors W1 to W3. Moreover, the prepared CG is an image for reflecting a result of mixing colors.

Checking Color Reproducing Region

It is necessary to examine whether a modified color can be realized in a desired painting process (2C1B or three-coat) and in a paint application line by using the "list of upper limits of color reproducing regions". Therefore, a method for preparing the "list of upper limits of color reproducing regions" is described below. It is examined whether a modified color is included in the range of the "list of upper limits of color reproducing regions" whenever preparing the modified color. If the modified color exceeds the range of the list, <warning> is displayed in the program execution screen in FIG. 3 to arouse an attention for the operator. Thereby, a danger of preparing a nonrealistic color which cannot be prepared in an industrial line is prevented.

Estimate Paint Formulation by Searching Approximate Color of Modified Color

It is possible to search a paint color having a small color difference by searching the color in accordance with a color library in order to actually prepare the prepared modified color. Table 4 shows a result of applying approximate color retrieval to the above prepared C1-1' to C3-7'. This table shows approximate color retrieval accuracies in accordance with color differences at four angles of 15°, 25°, 45°, and 75° which are searching results. It is shown that as a color difference decreases, it is possible to more smoothly search a color having a color appearance closer to a modified color. In general, in the field for evaluating an appearance, it can be said that a color difference of highlight of approx. 5, a color difference of front of approx. 3, and a color difference of shade of approx. 2 can be regarded as approximate colors in design. Thus, it is possible to retrieve 80% or more of approximate colors of modified colors from the table and prepare modified colors by using the past formulation of the approximate colors. In the case of a modified color having a large color difference, it is possible to calculate the formulation by using the following CCM.

Estimate Paint Formulation According to CCM of Modified Color

Table 4 shows a result of performing CCM of a metallic paint color. Estimated color differences of highlight 25°, front 45°, and shade 75° are shown in Table 4. It is shown that as an estimated color difference is smaller, a color prepared in accordance with an estimated formulation is closer. Though there may be a small estimated color difference and a large estimated color difference, the smaller estimated color difference is used by using the above approximate color retrieval together.

TABLE 4

Result of approximate color retrieval and result of CCM (Displayed by color difference)

| | Approximate color retrieval result | | | | CCM calculation result | | |
|---|---|---|---|---|---|---|---|
| Modified color name | 15° color difference | 25° color difference | 45° color difference | 75° color difference | 25° color difference | 45° color difference | 75° color difference |
| C1-1' | 3.7 | 3.2 | 1.8 | 0.7 | 1.6 | 0.5 | 0.7 |
| C1-2' | 3.5 | 3.1 | 2.0 | 0.5 | 4.1 | 0.9 | 3.4 |
| C1-3' | 4.5 | 3.8 | 2.1 | 0.9 | 4.1 | 0.5 | 3.1 |
| C2-1' | 4.3 | 2.6 | 1.4 | 1.3 | 7.2 | 1.4 | 2.6 |
| C2-2' | 4.1 | 2.9 | 1.6 | 1.1 | 2.9 | 0.8 | 0.7 |
| C2-3' | 3.2 | 2.1 | 1.3 | 0.8 | 6.3 | 1.3 | 0.9 |
| C2-4' | 5.2 | 4.9 | 2.5 | 1.3 | 1.6 | 1.1 | 1.0 |
| C3-1' | 3.0 | 2.4 | 1.3 | 2.3 | 2.6 | 1.4 | 1.2 |
| C3-2' | 4.2 | 3.8 | 2.8 | 2.2 | 3.9 | 2.5 | 1.7 |
| C3-3' | 2.8 | 2.1 | 1.4 | 1.6 | 3.4 | 2.2 | 1.8 |
| C3-4' | 3.3 | 2.7 | 1.6 | 1.1 | 3.8 | 1.8 | 2.0 |
| C3-5' | 5.1 | 4.2 | 3.1 | 1.4 | 4.3 | 4.4 | 4.1 |
| C3-6' | 3.7 | 2.6 | 1.9 | 1.2 | 8.2 | 5.2 | 3.3 |
| C3-7' | 4.4 | 2.8 | 1.4 | 1.2 | 2.1 | 1.8 | 2.5 |

The invention claimed is:

1. A modified-color generation and display method using a computer graphic, comprising:
   measuring the spectral reflectance of an original paint color using a spectrophotometer to obtain a measured spectral reflectance;
   obtaining a modified spectral reflectance for a modified color different from the original paint color by computing the modified spectral reflectance from the measured spectral reflectance; and
   displaying a computer graphic of the modified color on a monitor.

2. The method of claim 1, further comprising checking whether paint for generating the modified color can be prepared.

3. The method of claim 2, further comprising searching for a color approximating the modified color.

4. The method of claim 3, further comprising calculating a paint formulation for generating the modified color.

5. The method of claim 2, further comprising calculating a paint formulation for generating the modified color.

6. The method of claim 1, further comprising calculating a paint formulation for generating the modified color.

7. The method of claim 1, further comprising searching for a color approximating the modified color.

8. The method of claim 1, wherein said displaying comprises displaying the computer graphic of the modified color side-by-side with the original paint color on the monitor.

9. A modified-color generation and display apparatus, comprising:
  - a spectrophotometer for measuring the spectral reflectance of an original paint color and generating a measured spectral reflectance;
  - means for obtaining a modified spectral reflectance for a modified color different from the original paint color by computing the modified spectral reflectance from the measured spectral reflectance; and
  - a monitor for displaying a computer graphic of the modified color.

10. The apparatus of claim 9, wherein said monitor is operable to display the computer graphic of the modified color side-by-side with the original paint color on the monitor.

11. A modified-color generation and display method using a computer graphic, comprising:
  - measuring the spectral reflectance of an original paint color using a spectrophotometer to obtain measured spectral reflectance data;
  - obtaining modified spectral reflectance data for a modified color different from the original paint color by computing the modified spectral reflectance data from the measured spectral reflectance data; and
  - displaying a computer graphic of the modified color on a monitor using the modified spectral reflectance data.

12. The method of claim 11, further comprising checking whether paint for generating the modified color can be prepared.

13. The method of claim 12, further comprising searching for a color approximating the modified color.

14. The method of claim 13, further comprising calculating a paint formulation for generating the modified color.

15. The method of claim 12, further comprising calculating a paint formulation for generating the modified color.

16. The method of claim 11, further comprising calculating a paint formulation for generating the modified color.

17. The method of claim 11, further comprising searching for a color approximating the modified color.

18. The method of claim 11, wherein said displaying comprises displaying the computer graphic of the modified color side-by-side with the original paint color on the monitor.

19. A modified-color generation and display apparatus, comprising:
  - a spectrophotometer for measuring the spectral reflectance of an original paint color and generating measured spectral reflectance data;
  - means for obtaining modified spectral reflectance data for a modified color different from the original paint color by computing the modified spectral reflectance data from the measured spectral reflectance data; and
  - a monitor for displaying a computer graphic of the modified color.

20. The apparatus of claim 19, wherein said monitor is operable to display the computer graphic of the modified color side-by-side with the original paint color on the monitor.

* * * * *